United States Patent [19]

Scheetz et al.

[11] Patent Number: 5,434,223
[45] Date of Patent: Jul. 18, 1995

[54] NYLON 4.6 BLOCK COPOLYMERS

[76] Inventors: Howard A. Scheetz, 1245 Pleasure Rd., Lancaster, Pa. 17601; Jacob Koenen, Overhoven 118, 6136EH Sittard, Netherlands

[21] Appl. No.: 144,711

[22] Filed: Oct. 29, 1993

[51] Int. Cl.⁶ .............................................. C08L 77/00
[52] U.S. Cl. ..................................... 525/432; 525/420
[58] Field of Search ........................................ 525/432

[56] References Cited

U.S. PATENT DOCUMENTS

| 5,206,310 | 4/1993 | Yasue et al. | 525/432 |
| 5,250,619 | 10/1993 | Heinz et al. | 525/92 |

FOREIGN PATENT DOCUMENTS

| 4522348 | 7/1970 | Japan | 525/432 |
| 0201844 | 11/1983 | Japan | 525/432 |
| 0248775 | 12/1985 | Japan | 525/432 |
| 1070008 | 4/1986 | Japan | 525/432 |
| 2156161 | 7/1987 | Japan | 525/432 |

*Primary Examiner*—Ana L. Carrillo
*Attorney, Agent, or Firm*—Richard O. Church

[57] ABSTRACT

Block copolymers of nylon 4.6 are made by the solid phase polymerization of an alloy of nylons, including nylon 4.6, blended above the melting point of the nylons and then polymerized in particulate form under anhydrous conditions below the melting point of the nylons in the alloy. The block copolymers are characterized by their novel combination of properties which may include good melt strength, high melt viscosity, ductility (elongation), toughness (impact strength), good tensile strength and tensile modulus, high heat deflection temperatures, low crystallinity and high melting points.

20 Claims, 5 Drawing Sheets

NYLON 4.6 BLOCK COPOLYMERS

BACKGROUND OF THE INVENTION

A. FIELD OF THE INVENTION

Nylon 4.6 block copolymers are disclosed that are characterized by novel combinations of properties which may include good melt strength, high melt viscosity, ductility (elongation), toughness (impact strength), good tensile strength and tensile modulus, high heat deflection temperatures, low crystallinity and high melting points.

B. DEFINITIONS

As used herein the following terms and test procedures are defined as follows:

1. Melting point (MP). The exothermic peak which occurs during heating of small samples in a differential scanning calorimeter (DSC) (ASTM D3417).
2. Glass transition temperature ($T_g$). The damping peak which occurs between the hard glassy phase and the rubbery phase during heating of material on a dynamic mechanical analyzer (DMA) (ASTM 4065).
3. Relative viscosity (RV). The relative viscosity compares the viscosity of a solution of polymer in formic acid with the viscosity of the formic acid itself (ASTM D 789). The test results reported in this specification were obtained using 10.98 grams of nylon dissolved in 100 cc. of formic acid at 25° C.
4. Melt Viscosity (MV). An indicator of the melt flow characteristic of a resin as measured in Pascal.seconds (Pa.sec) with a Monsanto capillary melt rheometer measured at 316° C. under constant pressure conditions.
5. Degradation ratio (DR). A measure of the degree of degradation of the melt viscosity upon heating to above the melting point of the resin calculated by dividing the determined melt viscosity after 5 minutes dwell time by the melt viscosity after 17 minutes dwell time.
6. Heat deflection temperature (HDT). The temperature at which a rectangular bar of regular cross section deflects 0.025 cm under a load of 1820 kPa (264 psi) as specified in ASTM D 648-82. The test results given in the Examples were obtained using test specimens as molded (dry and not moisture conditioned) that were 3 mm ($\frac{1}{8}$ in.) in thickness.
7. Gardner Impact Strength. A test for the relative toughness (impact shock) of a polymer is conducted in accordance with ASTM D 3029 Test Method G using a Gardner variable height impact tester. In the test procedure a standard weight is dropped a measured vertical distance to determine when a test specimen, 0.32 cm (0.125 in) shatters. The maximum impact at which the test specimen survives is measured in joules. The Gardner test device used in obtaining the data given in the Examples had a limiting capability of measuring values up to 54 joules (480 inch-pounds) and all specimens surviving impacts of this value are rated as >54 joules.
8. Alloys. Intermolecular blends obtainable, for instance, by melt-blending blended nylons in which each nylon retains its own entity.
9. Copolymers. Polymers derived from more than one species of monomer, for instance the reaction product of two or more nylons in which the nylons are chemically combined with each other. Copolymers are sometimes referred to as intramolecular blends.
10. Random Copolymers. Copolymers in which monomers or precursors of several different types of nylon are polymerized in a random pattern with comparatively few units of the same type repeating in any given polymeric chain. Because there are few substantial blocks of homopolymers within a given polymeric chain, random copolymers can be expected to display distinctive properties that are different from the nylons of which they are comprised.
11. Block Copolymers. Copolymers in which the polymeric chains contain a number of repeating units (blocks) of the same nylon polymer. Block copolymers retain, to a lesser or greater extent depending on the number of repeating units of the same polymer within the blocks, identifiable physical properties of their constituent nylon polymers.
12. Reactive and non-reactive gases. "Reactive gas" is used to mean a gas that will react with nylon 4.6, as by oxidation, at the temperatures and conditions to which the nylon is exposed in the processes of the invention and "non-reactive gas" is used to mean gases that will not react with the nylon under these conditions.
13. Extractable impurities. This term is used to mean polymerization residues, such as monomers and oligomers, which can be removed by extraction in water or cyclohexane or by devolatilization at temperatures below the melting point of the nylon. In the case of nylon 4.6, extractable impurities begin to volatilize at useful rates at a temperature of about 175° C.
14. Particulate. An adjective used to describe resins in the form of discrete particles. Particulate resins are sometimes made by chopping small diameter (e.g. less than 1 cm.) extruded rods into approximately 0.3 to 0.8 cm. lengths and can also be made by compacting powders into small pellets, usually less than 1 cm. in diameter. The exact size and shape of particulate resins (also sometimes called "molding" resins) useful in this invention is not of great importance other than that for convenience in handling they should be larger than powders and that for efficient treatment they should be smaller than about 2 cm. and preferably smaller than about 0.5 cm. in diameter. It should also be mentioned that reference to nylon 4.6 resins, whether in particulate form or otherwise, refers to resins having molecular weights above about 15,000, which are useful, at least, in injection molding processes.

C. NYLON HOMOPOLYMERS

The need for polymeric materials which maintain good physical and chemical properties at elevated temperatures is rapidly expanding. By way of example, automotive demands for reduced weight and improved mileage have encouraged the use of plastic parts in the engine compartments of cars and trucks. These parts must maintain good strength and solvent resistance during prolonged exposure to the ambient conditions of engine compartments. Other suggested uses for nylons with good properties of elongation, abrasion resistance, wear, toughness and tensile strength at elevated temperatures include the manufacture of films and fibers.

Nylon 4.6[1] is an apt choice for use at moderately elevated temperatures because, relative to other commercially available aliphatic nylons, it has a higher melting point (296° C.), a higher $T_g$ (95° C.), and a higher heat deflection temperature (117° C.). Nylon 4.6 lacks, however, a high melt viscosity, good melt strength and thermal stability which makes it difficult to process in typical extrusion, fiber and film forming equipment. Products made from neat nylon 4.6 resins are also display poor ductility.

[1] Nylons are identified in the specification and claims using "." (a period) to separate the number designation of amine and acid groups and "/" (a slash) to separate copolymer components.

Nylons 6 and 6.6 are currently used extensively in the manufacture of fibers, films, and extrusion and injection molded shapes because of their desirable properties which include moldability, toughness, rigidity, tensile strength, chemical and wear resistance, dye acceptance and, particularly in the case of nylon 6, good elongation, typically about 200%. While nylons 6 and 6.6, and for that matter other commercially available aliphatic nylons, such as 6.10, 11 and 12 nylons, have a number of other well balanced properties, none of them have the superior high temperature performance of nylon 4.6.

D. NYLON ALLOYS AND COPOLYMERS

Nylons are commercially available that are alloys or copolymers of several different types of nylons. While the purpose in formulating these mixed nylon resins is to obtain an improvement in the properties of one of the component nylons, the improvements obtained in some properties are usually accompanied by a loss in other properties. This is well recognized in the case of the commercially available random copolymers of nylon. For example, nylon 6.6 is relatively poor in elongation (e.g. 60%) and toughness (e.g. Gardner impact of about 13 joules) but does have good tensile strength (e.g. 82 MPa) and a reasonably high melting point (e.g. 265° C.). Nylon 6, on the other hand, has good elongation (e.g. about 200%) and toughness (e.g. Gardner impact of about joules) but has a lower tensile strength (e.g. 65 MPa) and a lower melting point (e.g. 220° C.) than nylon 6.6. Nylon 6/6.6 random copolymers have properties that lie somewhere between those of nylon 6 and 6.6 nylon in which, for example, the elongation and toughness of the nylon 6.6 are somewhat improved but the tensile strength and high melting point of the nylon 6.6 is materially compromised. In this regard, it is reported in the literature that random copolymers of nylons have eutectic melting points that can lie below the melting point of the lowest melting nylon constituent.

In the practice of the instant invention, nylon copolymers are prepared by a solid phase polymerization in which condensation reactions between the end groups of the several nylons resins occur to join existing polymeric chains to each other in blocks. These block copolymers preserve substantial polymeric segments of each type of nylon which is in contrast to the relatively small segments of monomeric and oligomeric units which make up random copolymers. As will be demonstrated in the examples that follow, significantly different properties are obtained when the nylon constituents of a copolymer exist in "blocks" rather than "random pieces". The observed properties of a block copolymer more nearly reflect the better properties of the constituent polymers without suffering from a corresponding loss in other desired properties.

As noted above, the copolymerizations of this invention are conducted in the solid phase, that is below the melting of the constituent nylons. Reference is made to Japanese patent application JA-7022348-R of Asahi Chemical. Here it is suggested that block copolyamides may be prepared by mixing two or more polyamides, oligomers or polymers and heating them to above 150° C. and below the melting point of at least one of the components. No reference is made to nylon 4.6 as a component and, in the single example, nylon 6 and 6.6 are heated for three hours at a temperature of 260° C., well above the melting point of the nylon 6 but below the melting point of the nylon 6.6, and the copolymerization is then continued at 200° C. for 20 hours under a nitrogen blanket or under reduced pressure. The copolymer has a eutectic melting point of between 200 to 205° C., which, unlike the block copolymers of the present invention, is below the melting point of all of the component nylons. As is recognized in the prior art, a eutectic or depressed melting point which lies below the melting points of the nylons in a copolymer is a characteristic of a random or at least partially randomized copolymer.

SUMMARY OF THE INVENTION

It is, therefore, an object of the invention is to make nylon block copolymers containing nylon 4.6 which display a good balance of properties.

Another object of the invention to make nylon 4.6 block copolymers that retain many of the better properties of their component nylons.

Another object of the invention is to prepare nylon block copolymer resins containing nylon 4.6 from which articles can be made that are ductile and tough and have good high temperature performance.

Another object of the invention is to make nylon block copolymers with nylon 4.6 that are suited for use in melt forming processes including extrusion, film and fiber forming, and blow molding processes in which high melt strengths, relative viscosities and melt viscosities are important.

Yet a further object of this invention is to prepare all purpose nylon resins that may be selectively formulated to display a unique balance of a number of important properties including good melt strength, high melt viscosity, ductility (elongation), toughness (impact strength), good tensile strength, good tensile modulus, high heat deflection temperatures, low crystallinity and high melting points.

Another object of this invention is to prepare nylon 4.6 block copolymers that have melting points above the melting point of the nylon component having the lowest melting point.

A related object is to prepare nylon block copolymers from nylon 4.6 that have melting points below the melting point of the nylon 4.6 but above the melting points of the other nylons in the block copolymer.

Yet another object of the invention is to prepare all purpose nylon molding resins which may be melt formed into articles with elongations above 100%, Gardner impact strengths greater than 30 joules, tensile strengths greater than 80 MPa, tensile moduli above 3 GPa and heat deflection temperatures above 85° C.

These and other objects of this invention are achieved by the solid phase polymerization of alloys of nylon resins containing nylon 4.6 and at least one other, and preferably at least three other types of nylons. The alloys are prepared by melt mixing the component nylons above the melting point of the highest melting nylon component and a particulate resin is made from the melt mixed alloy. The nylon components of the particulate resin alloy are then copolymerized under anhydrous conditions at temperatures below the melting point of the nylon having the lowest melting point, preferably, in a range of from about 195° C. to about 235° C. and, more preferably yet, in a range of from 200° C. to about 220° C.

In a preferred embodiment of the invention, the particulate nylon resins used are substantially free from surface air.

It is also preferred that the moisture content of the resins be less than 0.2 wt %, preferably less 0.02 wt % and even more preferably less than 0.01 wt %. It is also preferred that the extractable impurities of the nylon resins be than 0.2 wt %, preferably less than 0.02%, and even more preferably less than 0.01 wt %.

The degree of purity required, that is the absence of air, moisture or extractable impurities in the nylon used in the invention, will vary from instance to instance depending upon the processing conditions and the property demands of the products that are intended to be made from the nylons copolymerized in the solid phase in accordance with the teachings of this invention. To illustrate this point, even trace amounts of extractable impurities, i.e greater than 0.01 wt %, can result in visually identifiable defects in films made from the solid phase copolymerization nylons of the invention. On the other hand, substantially higher levels of impurities can be tolerated in the case of extruded rods having diameters of about one or more centimeters.

BRIEF DESCRIPTION OF THE DRAWINGS

FIG. I is a bar chart showing changes that occur in the properties of elongation, Gardner impact, tensile strength and relative viscosity with increasing times of solid phase copolymerization conducted on an alloy compounded in accordance with this invention.

FIG. II compares the tensile strength of different formulations of nylon alloys, as compounded, with the tensile strength of the block copolymers that result from a 48 hour solid phase copolymerization cycle.

FIG. III compares the Gardner impact strength of different formulations of nylon alloys, as compounded, with the Gardner impact strength of the block copolymers that result from a 48 hour solid phase copolymerization cycle.

FIG. IV compares the elongation of different formulations of nylon alloys, as compounded, with the elongation of the block copolymers that result from a 48 hour solid phase copolymerization cycle.

FIG. V is a bar graph which compares the melting point of the block copolymer of Example I with the melting points of other nylons of Example I of which the block copolymer is comprised.

DETAILED DESCRIPTION OF THE INVENTION

Figure 1:
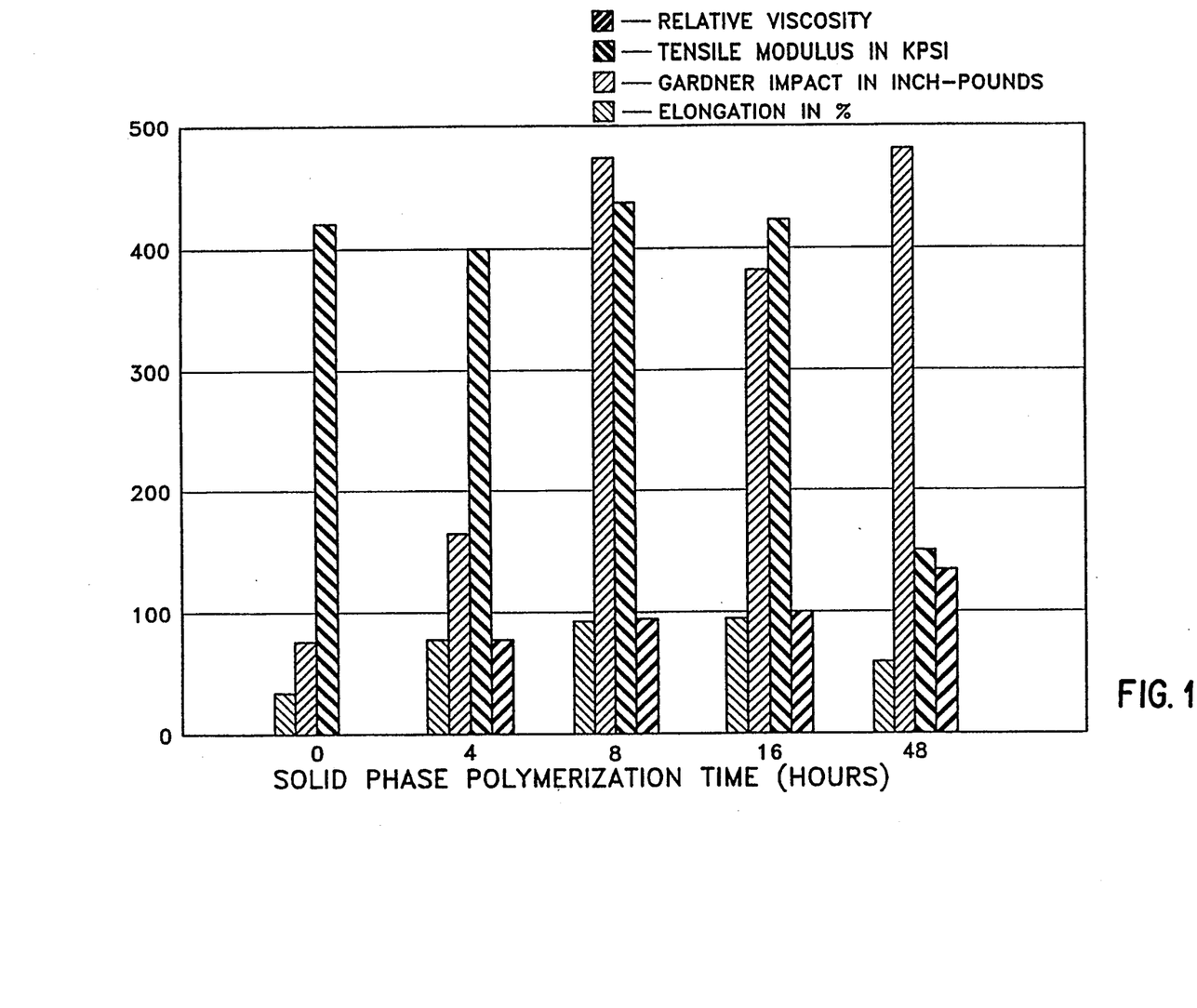
Figure 2:
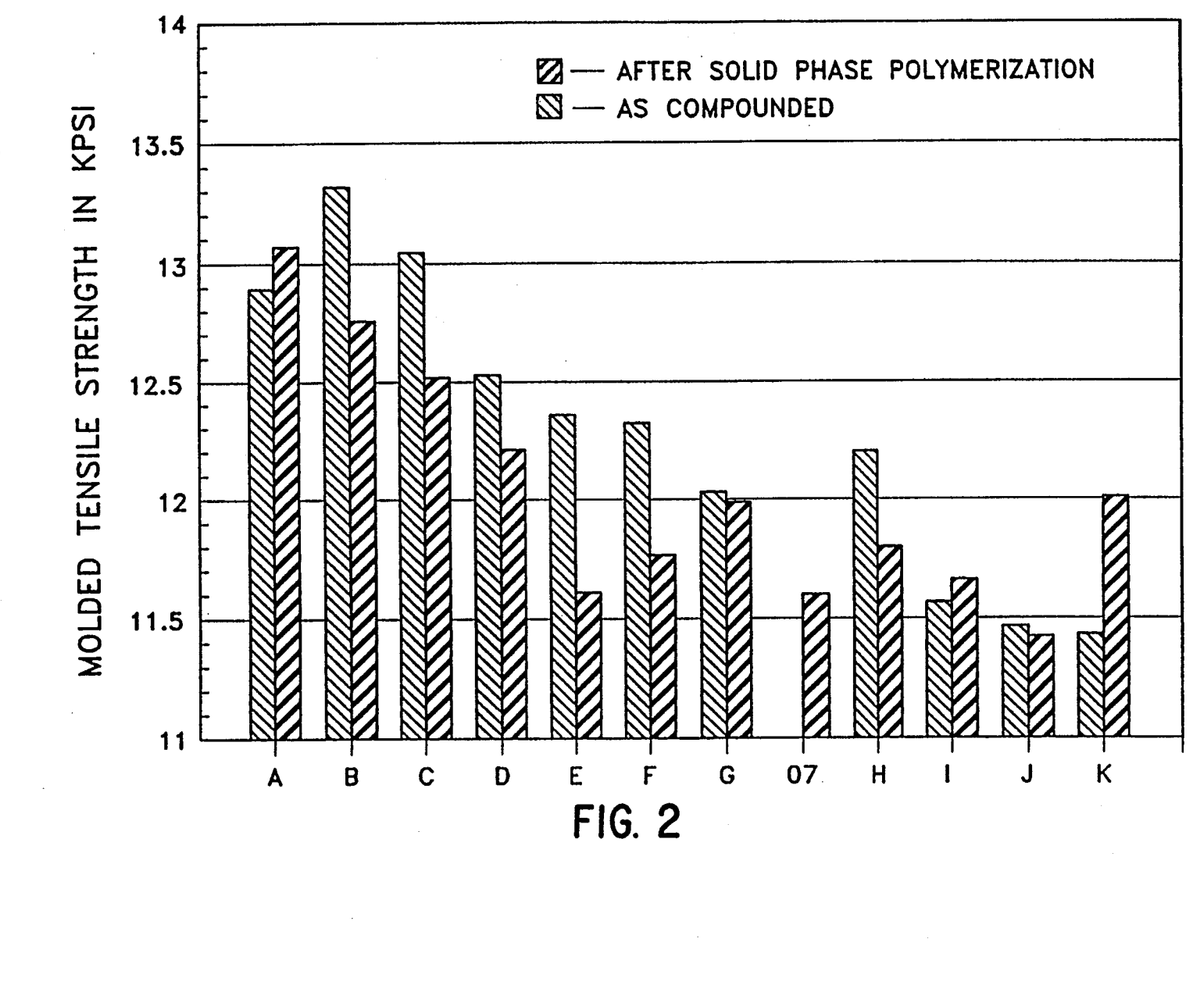
Figure 3:
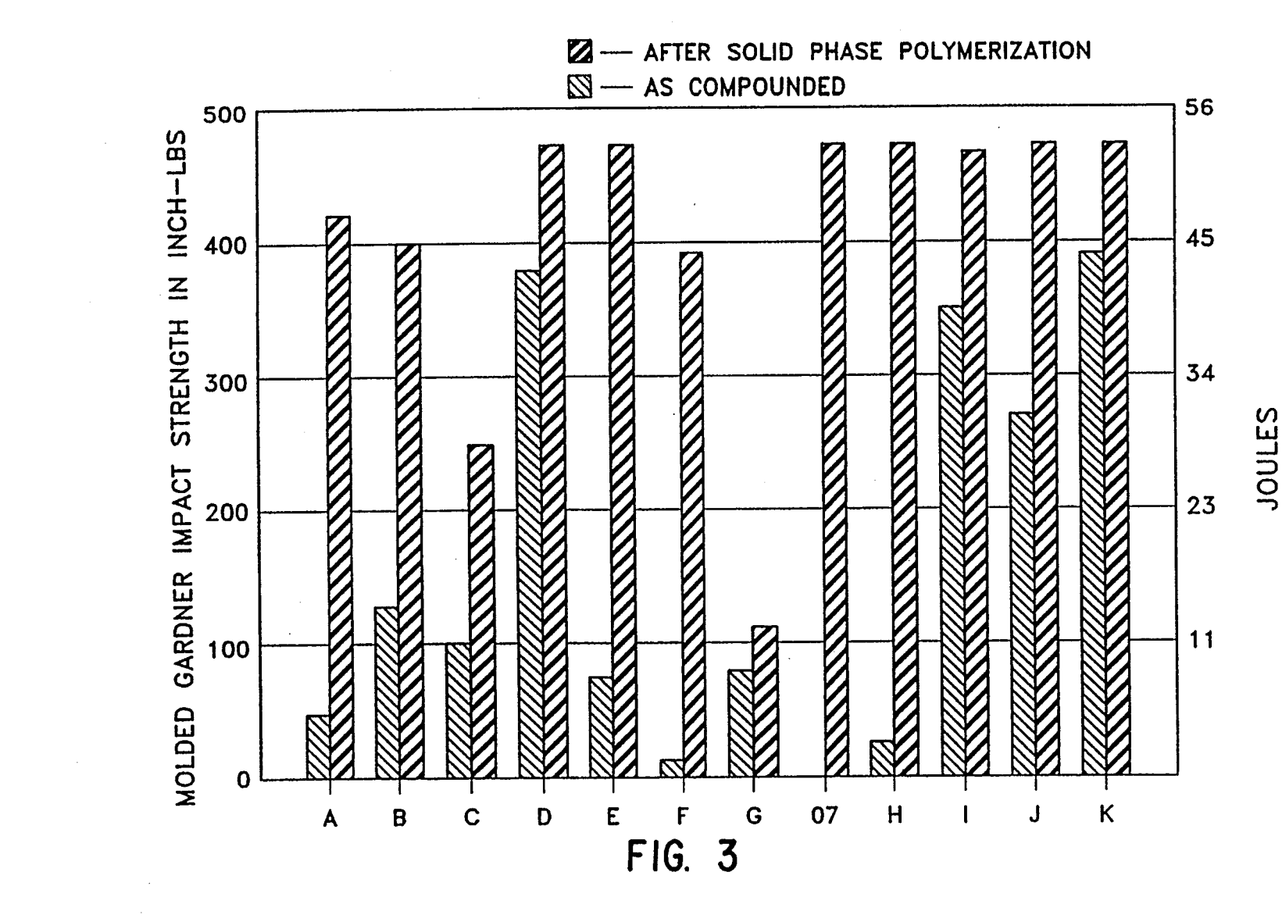
Figure 4:
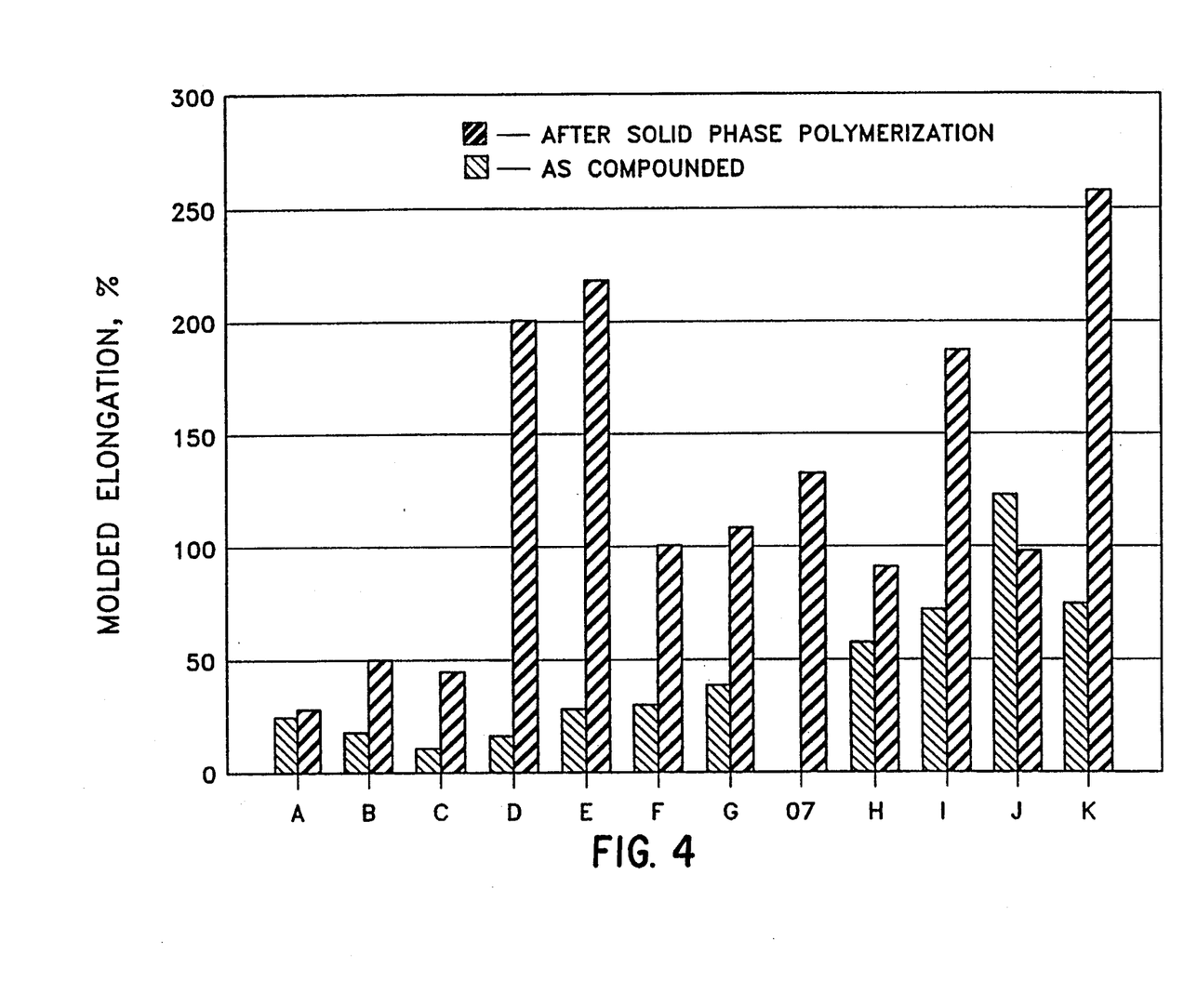
Figure 5:
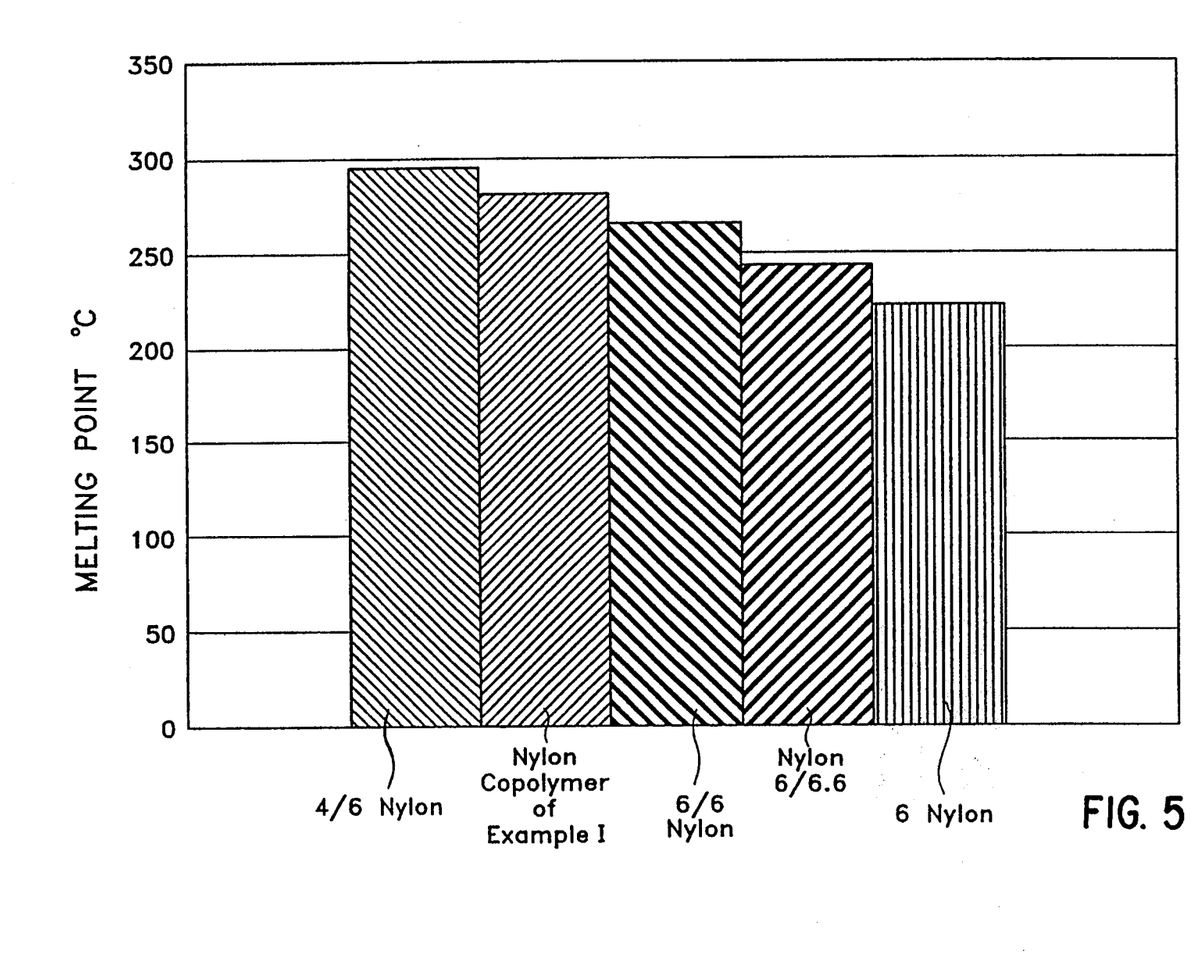

The solid phase copolymerization of nylons is most efficient and effective when:

a. the end groups of the several nylon polymers are reasonably balanced between amino end groups (AEG) and carboxyl end groups (CEG). Ideally, the end group balance is zero or, expressed algebraically:

$$AEG - CEG = 0 \text{ and} \tag{1}$$

b. the end groups are reactive, i.e., free from chain terminating blocked end groups (BEG) and, therefore ideally:

$$BEG = 0. \tag{2}$$

In practice, it is seldom possible to obtain nylons with no end group unbalance and no blocked end groups. It is to be preferred, however, that neither the end group unbalance nor the blocked end groups exceed 30 micro-equivalents per gram and, more preferably do not exceed 20 micro-equivalents, based upon the total weight of the nylon alloy used in the block copolymerization of the invention.

The nylon components utilized in the solid phase copolymerizations of this invention are melt blended to form an homogenous blend or alloy prior to the solid phase copolymerization. Since the melting point of nylon 4.6 is about 295° C., which may be expected to have the highest melting point of any aliphatic nylon used in preparing the alloy, the temperature at which the alloys are melt blended will be above 295° C. and, in the above Examples that follow, temperatures of between 305° C. and 315° C. were used. At these elevated temperatures, a number of undesirable reactions can occur: the presence of air on the surface of the resins can cause oxidation, the presence of water can cause hydrolytic degradation and the presence of water and cyclohexane extractable impurities (e.g. polymerization residues) can cause a number of side reactions to occur.

To the extent that reasonable options are available, it is preferred to use relatively "clean" resins that are dry (less than 0.2 wt %, more preferably less than 0.02 wt % and still more preferably less than 0.01 wt % water), that are free of surface air and that are low in extractable impurities (less than 0.2 wt %, more preferably less than 0.02 wt % and still more preferably less than 0.01 wt %). extractable impurities). The use of such "clean" resins will help optimize the properties of the alloys of this invention. If, on the other hand, relatively "clean" resins are not conveniently available, surface air, moisture and extractable impurities can be removed by heating the resins to appropriate temperatures in a vacuum or by purging them in a heated moving stream of a dry, heated non-oxidizing gas, such as nitrogen.

In the Examples that follow, all of the nylon alloys of nylon 4.6 were made using aliphatic nylons, though it should be understood that it is not intended that the invention be so limited and that it is meant to include the use of nylons having aromatic groups.

Examples

General Procedures

In the Examples that follow unless otherwise indicated, all percentages are given as weight percentages (wt %) and molecular weights are number averages (Mn).

Alloys were prepared by melting and mixing nylon resins in the barrel of a twin screw extruder (Leistritz) with a low shear screw design and extruding the alloy from a single strand die about 0.2 cm in diameter and the strand chopped into pellets in particulate form.

The apparatus used for processing the nylon alloy pellets in the following examples was an Abbe blender configured in the shape of two coaxially aligned cones sharing a common base. This permits agitating and mixing the contents of the blender by rotating the blender about an axis perpendicular to the elongated axes of the cones. The Abbe blender was fitted with an external jacket for the circulation of a heat exchange fluid to maintain temperature control. The blender was a closed vessel which could be sealed from the atmosphere to evacuate gases and establish a vacuum or, in the alternative, to circulate heated, dry, non-reactive gases through the blender and purge vapors and gases emanating from the surfaces of particulate resins.

EXAMPLE I

An alloy comprised of 55 wt % nylon 4.6, 20% wt 6.6 nylon, 20 wt % nylon 6 and 5 wt % of a nylon 6/6.6 copolymer was prepared by mixing the nylons above their melting temperature in a twin screw extruder and forming the alloy into pellets as described above. The end group analysis of the starting materials and suppliers were:

| NYLON | AEG | CEG | BEG | TEG |
|---|---|---|---|---|
| 4.6[1] | 45 | 75 | 5 | 125 |
| 6[2] | 43 | 40 | 0 | 83 |
| 6.6[3] | 39 | 59 | 14 | 112 |
| 6/6.6[4] | 35 | 61 | 10 | 107 |

[1] KS300 (DSM)
[2] H424 (Hanlon) Mn = 24,000; extractables 0.20%
[3] Zytel ® Z-101(DuPont)
[4] Vydyne ® VY86X (Monsanto); a copolymer of 13% nylon 6 and 87% nylon 6.6.

The particulate resins were solid phase polymerized in an Abbe blender as described above. The treatment consisted of an initial reduced pressure/heat cycle for four hours at 8 kPa (absolute) and 120° C. to remove surface air and moisture from the pellets followed by heating the dried resins to about 195° C. while still under vacuum to reduce the extractable impurities. Subsequently, a solid phase copolymerization was conducted at a temperature of 210° C. for 48 hours. At various times during the solid phase copolymerization, samples were removed and injection molded in a family mold and the as molded properties of elongation, Gardner impact, tensile modulus and relative viscosity were measured. The values of these properties are given in Table I below.

TABLE I

| TIME (Hrs.) | 0 | 4 | 8 | 16 | 48 |
|---|---|---|---|---|---|
| Tensile Strength (Kpsi) | 11.6 | 12.3 | 12.3 | 12.1 | 11.2 |
| Elongation (%) | 38 | 75 | 93 | 94 | 55 |
| Tensile Modulus (Kpsi) | 424 | 401 | 435 | 420 | 141 |
| Gardner Impact (joules) | 8 | 18 | 54 | 43 | 54 |

In addition to the properties listed in the table, after 48 hours treatment, the viscosity was measured at 1980 Pascal.seconds, the degradation ratio at 3.8 and the melting point at 282° C.

Particular reference is made to the bar chart of FIG. V in which the crystalline melting point of the block copolymer of this Example is compared with the melting points of the component nylons of the block copolymer. As noted above, one of the distinguishing features of the block copolymers made in accordance with this invention is that they do not display a eutectic melting point as is true of random copolymers. In point of fact, the crystalline melting point of the block copolymer of this Example is higher than that of the nylons 6, 6.6, and the 6/6.6 copolymer and only slightly below that of the nylon 4.6.

EXAMPLES II A-K

These examples illustrate the change in properties of tensile strength, Gardner impact strength and elongation obtained when a number of differently formulated alloys are reacted to form block copolymers by treatment of the alloys in a 48 hour cycle solid phase copolymerization process of the invention. In all cases the block solid phase copolymerization was conducted for 48 hours at 210° C. after an initial vacuum treatment of 30 minutes. The data obtained is graphically displayed in the bar charts of FIGS. I, II, III and IV respectively. In all cases, the melting points of the block copolymers was above about 270° C.

FORMULATIONS

| EXAMPLE | NYLON 4/6 Wt %/Type | NYLON 6 Wt %/Type | NYLON 6.6 Wt %/Type | NYLON 6,6.6 Wt %/Type |
|---|---|---|---|---|
| A | 77/300 | 10/MEX | 10/45AX | 3/VY |
| B | 66/300 | 15/MEX | 15/45AX | 4/VY |
| C | 44/300 | 25/MEX | 25/45AX | 6/VY |
| D | 33/300 | 30/MEX | 30/45AX | 7/VY |
| E | 22/300 | 35/MEX | 35/45AX | 8/VY |
| F | 55/200 | 20/MEX | 20/Z101 | 5/VY |
| G | 55/300 | 20/MEX | 20/Z101 | 5/VY |
| 07 | 55/200 | 20/H424 | 20/45AX | 5/VY |
| H | 55/200 | 20/8200 | 20/Z101 | 5/VY |
| I | 44/300 | 25/8200 | 25/Z101 | 6/VY |
| J | 33/300 | 30/8200 | 30/Z101 | 7/VY |
| K[2] | 55/300 | 20/8200 | 20/Z101 | 5/VY |

PROPERTY DATA

| EXAMPLE | TENSILE (Kpsi) NO SPP/ 48 HR.SPP | ELONGATION (%) NO SPP/48 HR.SPP | GARDNER IMPACT (j) NO SPP/ 48 HR.SPP |
|---|---|---|---|
| A | 12.9/13.1 | 24/28 | 6/48 |
| B | 13.3/12.8 | 19/50 | 15/45 |
| C | 13.0/12.5 | 11/46 | 11/29 |
| D | 12.6/12.2 | 17/201 | 43/54 |
| E | 12.4/11.6 | 29/219 | 8/54 |
| F | 12.3/11.8 | 31/101 | 1/44 |
| G | 12.0/12.0 | 38/109 | 9/13 |
| 07 | 11.6/11.6 | 20/132 | 4/54 |
| H | 12.2/11.8 | 56/91 | 3/54 |
| I | 11.6/11.7 | 72/188 | 39/54 |
| J | 11.4/11.4 | 112/98 | 31/54 |
| K | 11.4/12.0 | 75/257 | 44/54 |

[2] The alloy included 0.2 parts by weight per hundred parts resin of a high molecular weight, high density polyethylene as a processing aid

IDENTIFICATION OF NYLONS

Type 200. A low molecular weight nylon 4.6 obtained from DSM under the trade designation KS 200.

Type 300. A medium molecular weight nylon 4.6 obtained from DSM under the trade designation KS 300.

Type MEX. A nylon 6 obtained from AKZO under the trade designation Mex RP15 with AEG=35; CEG=60; BEG=11; TEG=106; extractables=0.33; elongation=45; RV=50.6; MV=5,185; Mn=18,800.

Type 8200. A nylon 6 obtained from Allied under the trade designation Capron 8200 with AEG=30; CEG=41; BEG=0; TEG=71; extractables=0.0;

elongation=249; RV=72; MV=6,500; Mn=28,200.

Type 45AX. A nylon 6.6 obtained from Monsanto with AEG=39; CEG=59; BEG=14; TEG=112.

Type Z101. A nylon 6.6 obtained from DuPont under the trade designation Zytel® with AEG=39; CEG=64; BEG=5; TEG=108.

Type H424. A nylon 6 obtained from Hanlon under the trade designation H424 with AEG=43; CEG=40; BEG=0; TEG=83; extractables=0.2; elongation=208; RV=72; MV=14,500; Mn=24,000.

Type VY. A nylon copolymer of 13 wt % nylon 6 and 87% nylon 6.6 obtained from Monsanto under the trade designation Vydyne® VY86X with AEG=35; CEG=61; BEG=10; TEG=107; extractables 0.4%; elongation=112%; RV=50; Mn=18,700.

EXAMPLE III

The block copolymer made in Example I was tested to determined its wear characteristics, here reported as a "K" factor, as is important in bearing and wear applications.

The test procedure here used to determine K wear factor is a thrust washer test as detailed in ASTM D-3702. The test method uses a molded thrust washer that is mounted on the end of a shaft and the washer is seated facing against a carbon steel (1018) bearing plate. Pressure is applied on the washer normal to the face of the plate and the shaft and washer are rotated relative to the plate.

The amount of wear on the test specimen, that is the depth of material worn (abraded) from the specimen and the duration of the test are recorded. Then the k factor is calculate using the following equation:

$$K = h/PVT \cdot 10^{-10}$$

in which:
h=calculated wear radial wear in inches;
P=pressure on the shaft in pounds per square inch;
V=relative velocity (sliding speed) in feet per minute; and
T=duration of test in hours.

The calculated value for K, is a number in units of cubic inches per foot.pound.hours (in$^3$/ft. lbs. hrs) expressed, for convenience, at $10^{-10}$. Lower K factors indicate less wear and longer bearing life. In the test reported below, the washer had an ID of 1.0625 inches, and OD of 1.125 inches, the pressure applied was 120 psi, the relative motion was 100 ft/min (PV=12,000) and the duration of the test was 24 hours.

Another wear test used to calculate the K factor uses a test specimen which is machined into a 0.5 inch ID journal bearing. A steel shaft is inserted into the journal, placed under a load and the shaft is rotated at a given angular velocity. The depth of the wear in the journal is measured in inches and the K factor is calculated from the same equation as given above. The K factor obtained in the journal bearing and washer test method are not the same, but they are similar in ranking. It is difficult to make quantitative comparisons between K factors since the conditions of the testing, i.e. relative velocity, pressure, duration, and ambient temperature may vary widely although qualitative approximate comparisons can often be made.

With the foregoing caveats in mind, the K value of some common plastic bearing materials are listed as follows:

| MATERIAL | Journal K FACTOR[3] | Washer K FACTOR[4] |
|---|---|---|
| Block copolymer of Example I | — | 9 |
| nylon 6.6, UHMWPE and PTFE | 35 | 22 |
| nylon 4.6 - medium MW | 52 | — |
| nylon 4.6 - low MW | 71 | — |
| nylon 6.6 - molding grade | 95 | 240 |
| Acetal (homopolymer) | 190 | 3600 |
| Acetal (copolymer) | 190 | Failed |
| Polybutylene terephthalate (PBT) | — | 4700 |
| Polyetherimide (neat) | — | 1800 |
| polytetrafluoroethylene | 32000 | |

[3] Tests conducted at PV=5000 for 200 hours at room temperature.
[4] Tests conducted at PV=12,000 for 24 hours at 150° C.

It is of particular note that the block copolymer of Example I has the highest ranking (lowest K factor) of the materials listed. Additional bearing tests were conducted to determine if there were any observable differences in wear between nylon random copolymers and nylon block copolymers. For a direct comparison, thrust washer tests were performed at a PV=12,000 for 24 hours at an ambient of 150° C. using:

1.) a commercially available random copolymer of nylon 4.6/6 (95% low MW nylon 4.6, 5% nylon 6) which yielded a K factor of 400;
2.) a commercially available random copolymer of nylon 4.6/6 (95% medium MW nylon 4.6, 5% nylon 6) which yielded a K factor of 200; and
3.) a block copolymer of nylon 4.6/6 prepared in accordance with this invention (95% medium MW nylon 4.6, 5% nylon 6) which yielded a K factor of 90. The block copolymer was also tested at PV=6,000 and PV=3,000 for 24 hours at an ambient of 150° C. and, in both instances, a K factor of 35 was obtained.

We claim:

1. Nylon block copolymers prepared by the anhydrous solid phase copolymerization of particulate nylon alloys comprised of 22 to 77 wt % 4.6 nylon and the balance of the nylon alloy is comprised of at least one additional type of nylon in which the nylons are blended above the melting points of all of the nylons in the alloy and in which the polymerization is conducted below the melting point of all of the nylon resins contained in the particulate alloys.

2. Nylon block copolymers in accordance with claim 1 wherein the particulate alloys used in the copolymerization are free of surface air.

3. Nylon block copolymers in accordance with claim 1 wherein the alloys used in the copolymerization have a combined end group balance (AEG-CEG) with an absolute value of no greater than 30 micro-equivalents per gram.

4. Nylon block copolymars in accordance with claim 3 wherein the combined end group balance is less than 20 micro-equivalents per gram.

5. Nylon block copolymers in accordance with claim 1 wherein the moisture content of the alloys used in the copolymerization is less than 0.2 wt % of the weight of the alloy.

6. Nylon block copolymers in accordance with claim 5 wherein the moisture content of the alloys used in the copolymerization is less than 0.02 wt % of the weight of the alloy.

7. Nylon block copolymers in accordance with claim 6 wherein the moisture content of the alloys used in the copolymerization is less than 0.01 wt % of the weight of the alloy.

8. Nylon block copolymers in accordance with claim 1 wherein the extractable impurities in the alloys used in the copolymerization is less than 0.2 wt % of the weight of the alloy.

9. Nylon block copolymers in accordance with claim 8 wherein the extractable impurities in the alloys used in the copolymerization is less than 0.02 wt % of the weight of the alloy.

10. Nylon block copolymers in accordance with claim 9 wherein the extractable impurities in the alloys used in the copolymerization is less than 0.01 wt % of the weight of the alloy.

11. Nylon block copolymers in accordance with claim 1 wherein the melting point of the block copolymers is between the melting point of the nylon 4.6 and the melting temperature of the lowest melting of the at least one other nylon.

12. Nylon block copolymers according to claim 1 in which the alloy is comprised of the at least one additional nylon and a nylon copolymer.

13. Nylon block copolymers according to claim 12 in which the nylon copolymer is a 6 and 6.6 copolymer.

14. Nylon block copolymers according to claim 1 wherein the melt blended nylon alloy is comprised of nylon 4.6 and at least three additional types of nylon.

15. Nylon block.copolymers according to claim 14 in which the at least three additional types of nylon are nylon 6, nylon 6.6 and a nylon copolymer.

16. A nylon molding resin comprised of 22 to 77 wt % nylon 4.6 and the balance of the nylon content comprised of at least one other nylon which are alloyed above the melting points of the nylons and then copolymerized under anhydrous conditions below the melting points of the nylons in the alloy in which the nylon block copolymer has an elongation greater than 100%, a Gardner impact strength greater than 34 joules, a tensile strength greater than 80 MPa, a tensile modulus greater than 3 GPa, a heat deflection temperature greater than 85° C., and crystallinity less than 30%.

17. A nylon molding resin according to claim 16 in which the at least one other nylon is selected from the group consisting of nylon 6, nylon 6.6 and a nylon copolymer.

18. A nylon molding resin according to claim 16 in which the alloy consists of from 30–77 wt % nylon 4.6, 10–30 wt % nylon 6, 10–30 wt % nylon 6.6 and 3 to 10 wt % of a nylon copolymer.

19. Nylon block copolymers according to claim 1 wherein the copolymer has a K wear factor of less than 100 as determined by a thrust washer test conducted at a PV of 12,000 for 24 hours at an ambient temperature of 150° C.

20. Nylon block copolymers according to claim 15 wherein the copolymer has a K wear factor less than 10 as determined in accordance with the method of ASTM D-3702 using a washer having an ID of 1.0625 inches and an OD of 1.125 inches in which the applied pressure is 120 psi, the relative motion is 100 feet per minute and the duration of the test is 24 hours.

* * * * *